(12) United States Patent
Geiger et al.

(10) Patent No.: US 8,556,114 B2
(45) Date of Patent: Oct. 15, 2013

(54) HANDLE FOR A COOKING VESSEL

(75) Inventors: Martin Geiger, Kuchen (DE); Dieter Reinhard, Deggingen (DE)

(73) Assignee: WMF Wuerttembergische Metallwarenfabrik AG (DE)

( * ) Notice: Subject to any disclaimer, the term of this patent is extended or adjusted under 35 U.S.C. 154(b) by 128 days.

(21) Appl. No.: 13/063,555

(22) PCT Filed: Sep. 16, 2009

(86) PCT No.: PCT/EP2009/062010
§ 371 (c)(1),
(2), (4) Date: Mar. 11, 2011

(87) PCT Pub. No.: WO2010/043465
PCT Pub. Date: Apr. 22, 2010

(65) Prior Publication Data
US 2011/0180559 A1    Jul. 28, 2011

(30) Foreign Application Priority Data
Oct. 16, 2008    (DE) .................... 10 2008 052 028

(51) Int. Cl.
*B65D 25/28*    (2006.01)
(52) U.S. Cl.
USPC .......................... 220/753; 220/573.1; 16/425
(58) Field of Classification Search
USPC .............. 220/759, 753, 752, 769, 912, 573.1;
16/425, 422, 110.1, 111.1
IPC ... A47J 45/08,45/07, 45/06, 23/00; B65D 25/28
See application file for complete search history.

(56) References Cited

U.S. PATENT DOCUMENTS

| | | | | |
|---|---|---|---|---|
| 3,846,902 A | * | 11/1974 | Sebring | 29/458 |
| 4,794,666 A | * | 1/1989 | Kim | 220/753 |
| 5,933,916 A | * | 8/1999 | Loschelder | 16/110.1 |
| 2006/0037176 A1 | * | 2/2006 | McGuyer et al. | 16/430 |
| 2009/0200314 A1 | * | 8/2009 | Beck | 220/573.1 |
| 2010/0007158 A1 | * | 1/2010 | Jung et al. | 294/34 |

FOREIGN PATENT DOCUMENTS

| | | |
|---|---|---|
| DE | 530761 | 7/1931 |
| DE | 1 109 334 | 6/1961 |
| DE | 298 02 921 | 6/1998 |
| EP | 0 508 972 | 10/1992 |
| GB | 24652 | 0/1914 |

OTHER PUBLICATIONS

The Carrotbox. "Bakelite—The Material of a Thousand Uses". Wayback Machine, http://web.archive.org/web/20040221104019/ http://www.thecarrotbox.com/plastic/bakelite.asp, Feb. 21, 2004, p. 1.*

* cited by examiner

*Primary Examiner* — Robert J Hicks
(74) *Attorney, Agent, or Firm* — Gerald E. Hespos; Michael J. Porco; Matthew T. Hespos

(57) ABSTRACT

A handle (1) for a cooking vessel has a handle body (3) with a hollow space (2) and at least one flange area (4, 4') for connecting the handle (1) to the cooking vessel. At least one sealing element (5, 5') made of plastic is provided and can be inserted into the hollow space (2) of the handle body (3) from the flange area (4, 4'). The sealing element (5, 5') seals the hollow space (2) to the outside.

11 Claims, 2 Drawing Sheets

HANDLE FOR A COOKING VESSEL

BACKGROUND OF THE INVENTION

1. Field of the Invention

The present invention relates to a handle for a cooking vessel having a handle body having a cavity and at least one flange region for attaching the handle to the cooking vessel. The invention also relates to a cooking vessel which is equipped with such a handle.

2. Description of the Related Art

To be able to keep handles of cooking vessels at tolerable temperatures, even as far as possible during the cooking process, so that they can be grasped safely, hollow metal handles are usually used, in which the air present in the hollow body of the metal handle acts as an insulator. Such handles are usually bent from pipes or manufactured as half shells and must be watertight because of their use. The watertight configuration of the hollow handles is of great importance in particular during washing, as otherwise water can penetrate and encourage rusting processes which damage the cooking vessel in the long term. In order to be able to seal off the cavity situated inside the hollow handle from the outside, it is known to crimp regions of such handles together or to provide them with a cap and then weld them shut. The known techniques for sealing off the cavity situated inside the hollow handle are however expensive and complex and do not always result in a complete seal, so that water can penetrate into the hollow handle and start rusting processes there despite the crimping or welding.

The present invention is concerned with the problem of specifying an improved embodiment for a handle of the generic type, which embodiment is characterised in particular by inexpensive, simple and effective sealing off of a cavity situated inside the handle.

SUMMARY OF THE INVENTION

The invention is based on the general idea of providing, in a handle for a cooking vessel with a handle body which has a cavity, a sealing element consisting of plastic which is configured in such a manner that it closes the cavity of the handle body tightly off from the outside after being inserted into the latter. The handle can furthermore have a flange region for attaching the same to the cooking vessel, the sealing element usually being inserted from the flange region into the cavity of the handle body. The clear width of the cavity of the handle body is preferably matched to an outer dimension of the sealing element, the outer dimensions of the sealing element preferably being slightly greater than the clear width of the handle body, so that the sealing element can be inserted or pressed into the cavity of the handle body under stress and comes to lie there in a compressed manner in such a manner that ingress of for example water into the cavity of the handle body can be reliably prevented. Furthermore, such sealing elements consisting of plastic can be produced extremely inexpensively and in virtually any shape, so that clear cost advantages can be realised compared to sealing techniques known from the prior art such as crimping or welding. It is furthermore of particular advantage that the properties of plastics can be adapted to virtually all requirements, so that a wide range of uses is opened up for such sealing elements.

In an advantageous development of the solution according to the invention, the plastic used for the sealing element is heat-resistant and dishwasher-safe and in particular consists of an elastomer. As cooking vessels are usually exposed to high temperatures and sometimes aggressive environmental conditions such as in a dishwasher, all components of the cooking vessel, including of course the sealing element, must be able to withstand these hard environmental conditions, even for longer periods. The plastics used for this, for example elastomers, are dimensionally stable but elastically deformable plastics, the glass transition point of which is below room temperature. For this reason, elastomers in particular are often used for seals, as their elastic and thus sealing properties are effective even at room temperature.

In an advantageous development of the solution according to the invention, the sealing element has a head or a collar with which it bears against the flange region of the handle when it reaches an insertion end position. The sealing element thus has a type of cork shape which prevents the same from being inserted too far into the cavity of the handle body, as, when the insertion end position is reached, the collar which projects radially outwards bears against the flange region or the handle body and thereby prevents inadvertent further insertion.

Further important features and advantages of the invention can be found in the drawings and the associated description of the figures using the drawings.

It is self-evident that the features which are mentioned above and those which are still to be explained below can be used not only in the combination specified in each case, but also in other combinations or alone without departing from the scope of the present invention.

Preferred exemplary embodiments of the invention are shown in the drawings and are explained in more detail in the following description, with the same reference symbols referring to the same or similar or functionally identical components.

DETAILED DESCRIPTION OF THE PREFERRED EMBODIMENTS

Figure 1:
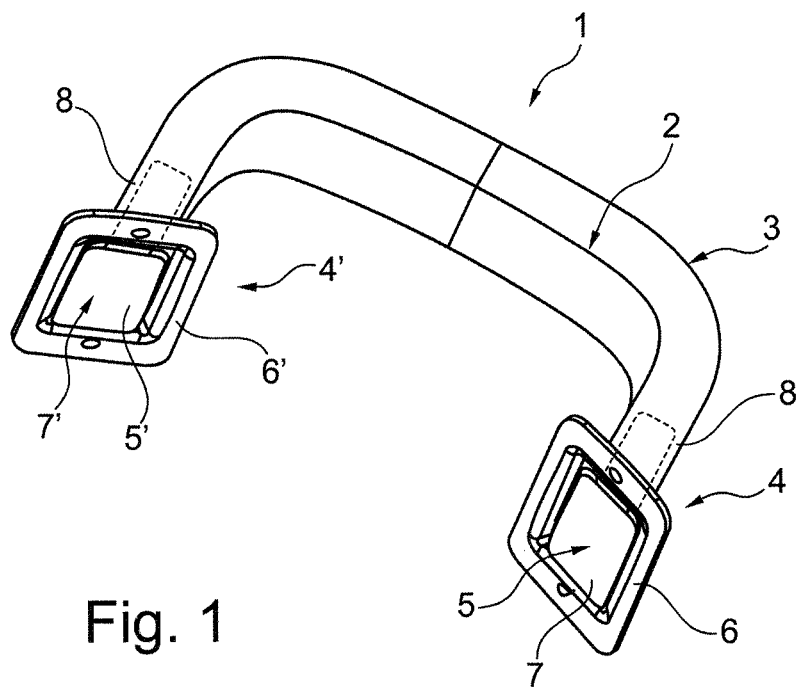
FIG. 1 schematically shows a handle with two sealing elements according to the invention consisting of plastic.
Figure 2:
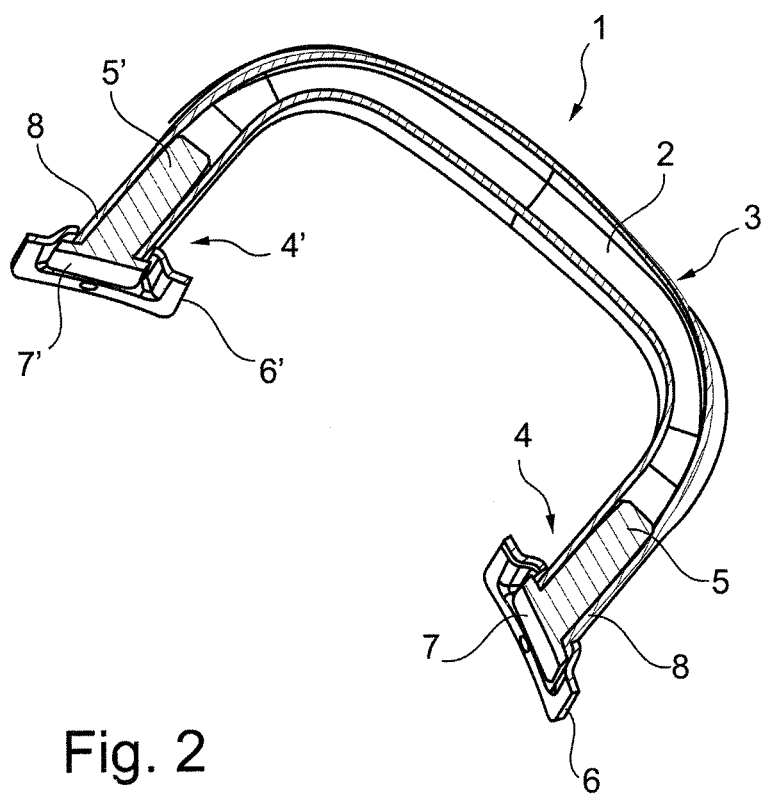
FIG. 2 schematically shows a sectional diagram of the handle shown in FIG. 1.
Figure 3:
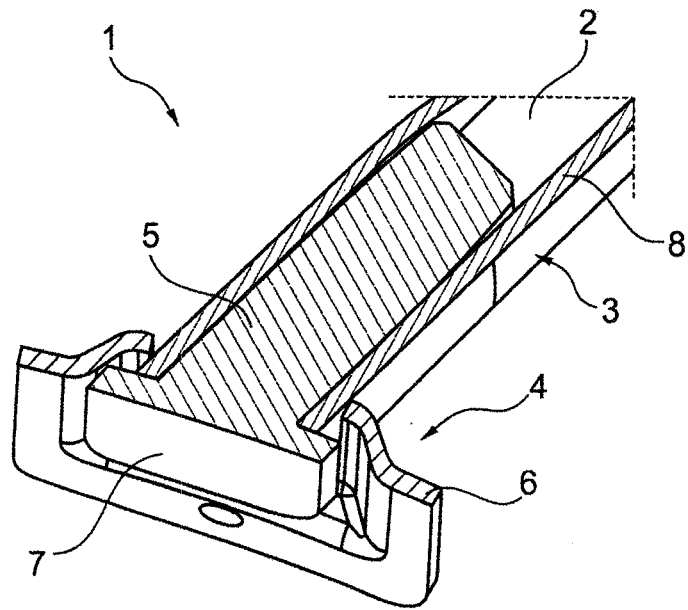
FIG. 3 schematically shows a sectional diagram of a flange region of the handle.
Figure 4:
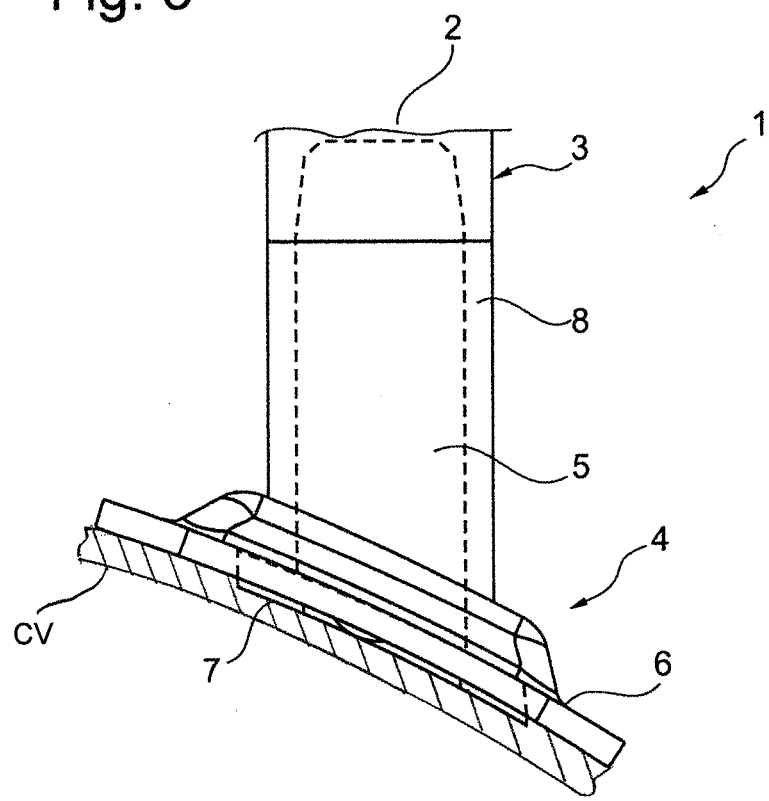
FIG. 4 schematically shows a detailed diagram of a flange region of the handle.

According to FIG. 2, a handle 1 according to the invention for a cooking vessel CV in FIG. 4 has a handle body 3, which has a cavity 2, as well as two flange regions 4 and 4' for attaching the handle 1 to the cooking vessel. The handle body 3 is hollow, with the air contained in the cavity 2 acting as an insulator and helping to ensure that the handle 1 does not overheat, even during a cooking process, so that there is no risk of burns in particular when the handle 1 is grasped. In order to be able in particular to prevent ingress of water into the cavity 2, according to the invention at least one sealing element 5 is provided (two sealing elements 5 and 5' in each case according to FIGS. 1 and 2), which is configured in such a manner that it can be inserted from the flange region 4, 4' into the cavity 2 of the handle body 3 and close off the cavity 2 tightly from the outside. To this end, an outer dimension of the sealing element 5 is at least slightly greater than a clear width of the cavity 2 in the flange region 4, 4', so that the sealing element 5, 5' can be pressed under stress into the cavity 2 and is fixed there in a self-clamping manner.

The sealing element 5, 5' is formed from plastic, in particular from a heat-resistant and dishwasher-safe plastic, and thereby tolerates the temperatures typically occurring during use of the cooking vessel without problems. An elastomer can be used as a particularly preferred plastic for the sealing element 5, 5'. When the handle 1 is fastened to the cooking vessel, the sealing element 5, 5' is covered by an attachment flange 6, 6' of the flange region 4, 4' and is therefore not visible from the outside.

In a preferred embodiment of the solution according to the invention, the sealing element 5, 5' has a head or a collar 7, 7', with which it bears against a wall 8 bounding the cavity 2 or against the flange region 4, 4' when its insertion end position is reached and thereby prevents the sealing element 5, 5' from being inserted too far into the cavity 2. Such sealing elements 5, 5' formed from elastomer can generally be produced in virtually any embodiment and inexpensively and offer high security against undesired ingress of water into the cavity 2, which in the long term can result in rusting processes there and thus to destruction of the cooking vessel or of the handle 1. The handle body 3 can for example be bent from a pipe or composed of at least two half shells.

A use of such sealing elements is also conceivable in what are known as wire handles which typically have a solid handle body which is enclosed in the region of an attachment flange to a cooking vessel for example by such a sealing element so that in this case too ingress of water can be reliably prevented. The sealing element 5, 5' can furthermore, particularly if it can be seen from the outside, also be formed as a design element or distinguishing feature for different product lines. If used as a design element, an almost free choice of colour for the elastomers is possible.

With the sealing elements 5, 5' according to the invention, a cavity 2 of the handle body 3 can be effectively sealed off from the outside so that rusting processes arising in the latter typically as a result of penetrating water can be reliably excluded. It is self-evident that the handle 1 can be attached to the cooking vessel not by two attachment flanges 6 and 6' but for example also by just one, in which case it is formed as what as known as a stick-type handle. A complex, expensive and not necessarily reliable crimping or welding of the cavities 2 at the flange region 4, 4' can in particular be replaced by the use of such sealing elements 5, 5'.

The invention claimed is:

1. A handle (1) for a cooking vessel, comprising:
    a handle body (3) having a substantially tubular wall (8) with at least one end and a cavity (2) at least adjacent the end;
    at least one sealing element (5, 5') formed from an elastically deformable plastic and having a sealing body inserted into a portion of the cavity (2) of the handle body (3) adjacent the end of the tubular wall (8), the sealing body having a first end cross-sectionally smaller than the cavity (2) and a second end dimensioned to fit in the cavity (2) under stress so that the sealing body closes off the cavity (2) tightly to prevent intrusion of water from the outside, a collar (7) unitary with the second end of the sealing body, the collar (7) being external of the cavity (2) and contacting the end of the tubular wall (8);
    an attachment flange (6, 6') projecting out from the tubular wall (8) and covering the collar (7) of the sealing element (5, 5').

2. The handle of claim 1, characterized in that the plastic used for the sealing element (5, 5') is heat-resistant and dishwasher-safe and is formed from an elastomer.

3. The handle of claim 1, characterized in that the handle (1) has two flange regions (4, 4') and two sealing elements (5, 5').

4. A cooking vessel comprising:
    a cooking vessel wall; and
    a handle (1) having a handle body (3) with a substantially tubular wall (8) having at least one end and a cavity (2) at least adjacent the end, at least one plastic sealing element (5, 5') having an elastically deformable sealing body inserted into a portion of the cavity (2) adjacent the end of the tubular wall (8), the sealing body having a first end cross-sectionally smaller than the cavity (2) and a second end dimensioned to fit in the cavity (2) under stress so that the sealing body closes off the cavity (2) tightly to prevent intrusion of water from the outside, a collar (7) unitary with the sealing body, the collar (7) being external of the cavity (2) and contacting the end of the tubular wall (8), an attachment flange (6, 6') projecting out from the tubular wall (8) and covering the collar (7) of the sealing element (5, 5'), the attachment collar being attached to the cooking vessel wall so that the collar (7) of the sealing element (5, 5') is not visible from outside.

5. A handle (1) for a cooking vessel, said handle (1) comprising:
    a handle body (3) having a tubular wall (8) with at least one end and a cavity (2) formed in the tubular wall (8) at least adjacent to the open end;
    at least one plastic sealing element (5, 5') having a sealing body with opposite first and second ends, the first end being cross sectionally smaller than the cavity and being fit loosely into the cavity, the second end being tightly fit into the cavity (2) adjacent the end of the tubular wall (8) and being dimensioned and configured to be under stress in the cavity (2) for closing off the cavity (2) tightly to prevent intrusion of water from regions outside the handle (1), a collar (7) projecting out from the sealing body radially beyond the tubular wall (8) and engaging the end of the tubular wall (8); and
    an attachment flange (6, 6') attached to a portion of the tubular wall in proximity to the end of the tubular wall (8), an end of the attachment flange (6, 6') remote from the tubular wall being configured for attachment to the cooking vessel while covering and concealing the collar (7) of the sealing element (5, 5').

6. The handle (1) of claim 5, wherein the flange (4, 4') has a concave surface facing away from the handle body (3), the sealing body of the plastic sealing element (5, 5') being formed unitarily with the collar (7, 7'), the collar (7, 7') being nested in the concave surface of the flange (4, 4') and abutting the open end of the handle body (3).

7. The handle (1) of claim 6, wherein the flange (4, 4') is formed separately from the handle body (3).

8. The handle (1) of claim 6, wherein the plastic sealing element (5, 5') is press fit into the cavity (2).

9. The handle (1) of claim 8, wherein the plastic sealing element (5, 5') is formed from an elastomer.

10. The handle (1) of claim 8, wherein the plastic sealing element (5, 5') is heat-resistant and dishwasher-safe.

11. The handle of claim 5, wherein the at least one open end comprises first and second open ends, the at least one flange (4, 4') comprising first and second flanges (4, 4') in proximity respectively to the first and second open ends, the at least one plastic sealing element (5, 5') comprising first and second plastic sealing elements (5, 5') tightly fit in the cavity (2).

* * * * *